W. E. WHITEHEAD.

FEEDING MECHANISM FOR COTTON OPENERS, &c.

No. 4,722. Reissued Jan. 23, 1872.

Witnesses.
John S. Deeby
Albert W. Moore

Inventor.
William E. Whitehead.
by Abel T. Atherton,
his Attorney in fact

W. E. WHITEHEAD.

FEEDING MECHANISM FOR COTTON OPENERS, &c.

No. 4,722. Reissued Jan. 23, 1872.

*Witnesses.*

John S. Derby

Albert M. Moore.

*Inventor.*

William E. Whitehead.

by Abel T. Atherton, his Attorney.

UNITED STATES PATENT OFFICE.

WILLIAM EDWARD WHITEHEAD, OF MILES PLATTING, ENGLAND, ASSIGNOR TO HIMSELF AND ABEL T. ATHERTON, OF LOWELL, MASS.

IMPROVEMENT IN FEEDING MECHANISMS FOR COTTON-OPENERS, &c.

Specification forming part of Letters Patent No. 110,318, dated December 20, 1870; reissue No. 4,722, dated January 23, 1872.

I, WILLIAM E. WHITEHEAD, of Miles Platting, county of Lancaster, England, have invented new and useful Improvements in Openers, Pickers, Scutchers, Carding-Engines, &c., of which the following is a specification:

The nature of my invention consists in the employment of separate flat plates, upon which the cotton is fed to the beaters, in combination with a feed-roller, which is capable of being adjusted laterally in position over the same without disarranging the feeding action, and in connection therewith a shell-plate, which holds the cotton to the beaters, and a self-regulating device, acting between the flat plates and the feed-roller, whereby the rate of the feed-motion is accelerated or retarded as less or more cotton is brought under the feed-roller in any part, all as hereinafter specified.

The accompanying drawing represents my invention.

The same letters where they appear refer to corresponding parts of the machine.

Figure 1:
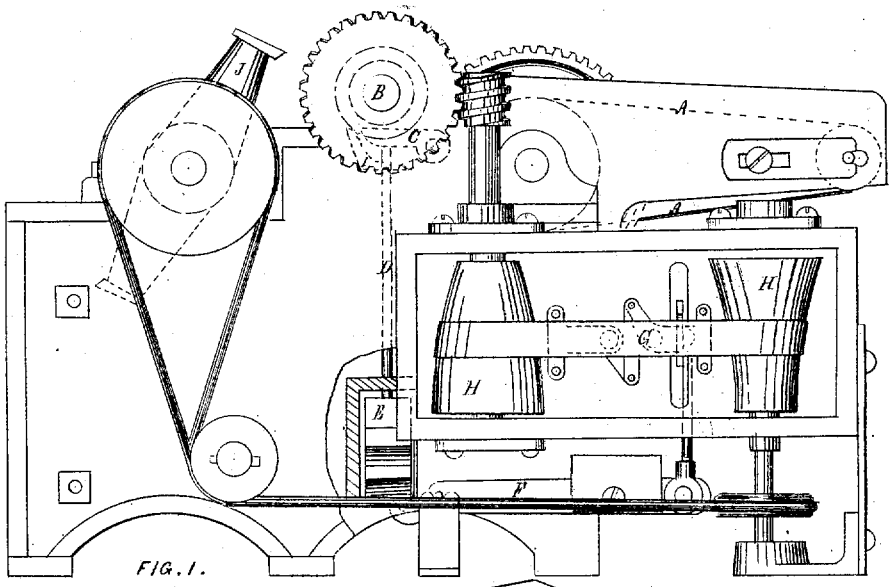
Figure 2:
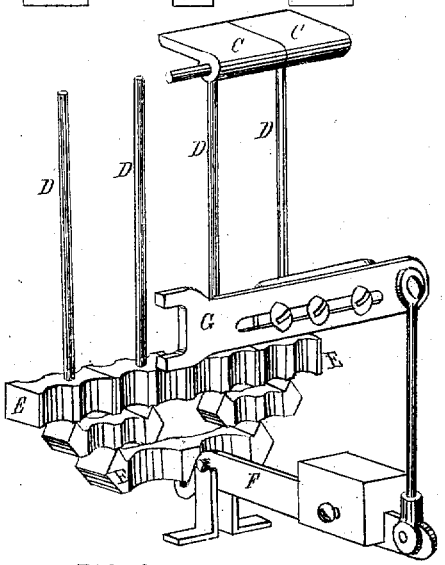
Figure 3:
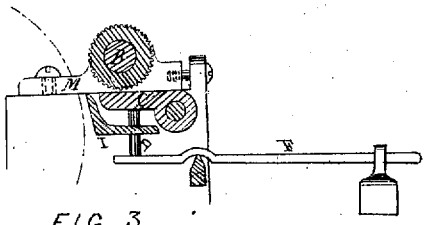
Figure 4:
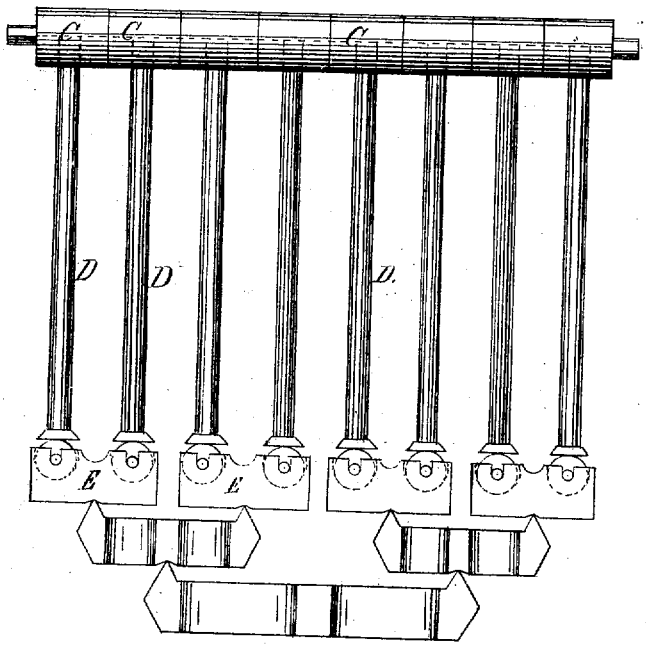
Figure 5:
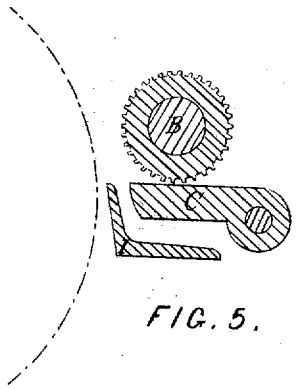
Figure 6:
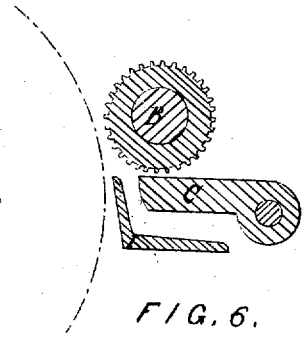

Figure 1 is a side elevation of a picker with my improvements attached. Fig. 2 is a perspective view of the arrangement of levers for working belt-shipper, showing the series of plates independent of each other connected to independent beams. Fig. 3 represents a method of weighting the plates, and also of adjusting the feed-roller, with the independent shell-bar attached. Fig. 4 is a view of another arrangement of plates with beams, showing a series of plates connected in pairs with independent beams. Figs. 5 and 6 represent the different positions of the feed-roller in working long or short staple of cotton, the dotted lines representing the track of the beater-blades.

A is the apron. B is the feed-roller. C C are two of a number of plates, said plates being flat on their upper surface. D D D are perpendicular rods, connected at one end to the beams E E E and pressing with the other end the plates C C. F is a weighted lever, by the operation of which the rods D D D press against the plates C C. By the operation of said plates the lever F communicates motion to the shipper G, said shipper-rod operating the belt on cone-pulleys H H, and regulating thereby the speed of the feed-roller. I is an independent shell-plate or bar placed between the flat plates and the beater, its purpose being to relieve the plates C C from the concussion of the beater when acting on the cotton, as said concussion interferes, when working hard cotton, with the regulating arrangement of said plates, and renders them less sensitive to the action of the cotton passing over the plates. Said shell-bar can be quickly detached from the machine when desired. In working some kinds of cotton said shell-bar can be dispensed with. J is a beater, of a form commonly in use. M is one of two stands, which can be made adjustable or fixed, said stands containing the feed-roll. In Fig. 3 the roller B is arranged on an adjustable stand, M, so that, in connection with the plates C C and shell-plate I, the said roller can be regulated to work any length of fiber without damaging the staple.

The cotton to be cleaned or opened is placed upon the apron, and, by the operation of the machine, is carried between the feed-roller and plates C C and acted upon by the beater. Said plates, by being narrow and weighted separately, press all portions of the cotton against the feed-roller and prevent any part of said cotton from being drawn from the apron faster than is desired. This insures positive action upon every particle of fiber passing to the beater, and renders only one operation of said beater necessary, where heretofore, when one long flat plate has been used, it has been found necessary to pass the cotton through the machine several times before the same is sufficiently free from dirt. The cotton passing over the plates C C causes the action of the shipper-rod G through the medium of said plates, rods D D, beams E E, and lever F, and perfectly regulates the speed of the feed-roll, and consequently equalizes the quantity of the same passing to the beater. It is necessary in working cotton to be able to use long or short fiber without delay in changing machinery and with equal advantage. I accomplish this result by means of the feed-roller being capable of being adjusted. When it is not material to use the weighting and shifting devices combined, as shown in Fig. 2, I employ a simple form of weighting each of the plates separately, as shown in Fig. 3.

Concave plates or troughs, in combination with a weighting and shifting apparatus, (Lord's patent, No. 52,008,) have been in use for several years, and I do not claim these as my invention, as results have been accomplished by the use of my invention which I regard as impossible by the use of other machinery invented for this purpose.

I claim as my invention—

1. The separate flat plates C C, in combination with the feed-roller B, substantially as and for the purpose herein specified.

2. The combination of the separate flat plates C C, feed-roller B, and shell-plate I with the weighting and shifting devices herein described, as and for the purpose specified.

3. The combination, with the flat plates C C and feed-roller B, of the rods D D, beams E E, weighted lever F, shipper-rod G, and cone-pulleys H H, arranged and operating as herein specified.

WILLIAM EDR. WHITEHEAD.

Witnesses:
JOHN S. DEVLIN,
ALBERT M. MOORE.